United States Patent [19]

Holmes

[11] 4,364,093

[45] Dec. 14, 1982

[54] TELEVISION GHOST CANCELLATION SYSTEM WITH PHASE-CONTROLLED REMODULATION

[75] Inventor: David D. Holmes, Chesterfield, N.J.

[73] Assignee: RCA Corporation, New York, N.Y.

[21] Appl. No.: 274,179

[22] Filed: Jun. 16, 1981

[51] Int. Cl.³ .............................................. H04N 5/31
[52] U.S. Cl. ..................................... 358/167; 358/905
[58] Field of Search ........................ 358/166, 167, 905

[56] References Cited

U.S. PATENT DOCUMENTS

| | | | |
|---|---|---|---|
| 4,047,224 | 9/1977 | Yamaguti | 358/166 |
| 4,128,848 | 12/1978 | Nakagawa | 358/167 |
| 4,285,006 | 8/1981 | Kurahashi et al. | 358/35 |

OTHER PUBLICATIONS

An Article, "A Tutorial on Ghost Cancelling in Television Systems" by W. Ciciora et al., Published in IEEE Trans. CE-25, Feb. 1979, pp. 11 and 12 and FIG. 14.

*Primary Examiner*—Richard Murray

*Attorney, Agent, or Firm*—E. M. Whitacre; P. J. Rasmussen; W. B. Yorks, Jr.

[57] ABSTRACT

A television ghost signal cancellation system is provided which compensates for the phase of the ghost carrier signal. A video signal containing a ghost signal component is applied to a variable delay line, which delays the video signal by an amount of time equal to the difference in time between the appearance of the direct video signal and its corresponding ghost signal components. The delayed video signal is modulated by a carrier signal and demodulated by a phase-shifted version of the carrier signal. The carrier signal is phase-shifted for the demodulator by an amount which compensates for the phase difference between the picture carriers of the direct and ghost signals. The demodulated signal is inverted and its amplitude adjusted to produce a pseudo-ghost signal which is substantially equal in amplitude but opposite in polarity to the ghost signal components. The pseudo-ghost signal is summed with the original video signal to cancel the ghost signal components, thereby producing a deghosted video signal.

9 Claims, 3 Drawing Figures

TELEVISION GHOST CANCELLATION SYSTEM WITH PHASE-CONTROLLED REMODULATION

This invention relates to television ghost signal cancelling systems and, in particular to a ghost cancellation system in which the ghost-contaminated video signal is remodulated and demodulated to compensate for the phase of the ghost carrier signal.

Television reception has long been plagued by the reception of undesired multiple signals. These undesired signals, reflected from buildings and other large objects, appear as delayed versions of the direct television signal, and are commonly referred to as ghost signals in the reproduced image. The ghost signals will be delayed from the direct signal as a function of the relationship of the signal path lengths between the direct and the ghost signals. The randomness of this relationship from one receiver location to another dictates that the phase of the ghost carrier signal may have any relationship to the phase of the direct signal. In order to fully remove the ghost signal from the direct signal, it is necessary to consider both the delay of the ghost signal and its carrier phase relative to the direct television signal.

In accordance with the principles of the present invention, a television ghost signal cancellation system is provided which compensates for the phase of the ghost carrier signal. A video signal containing a ghost signal component is applied to a variable delay line, which delays the video signal by an amount of time equal to the difference in time between the appearance of the direct video signal and its corresponding ghost signal components. The delayed video signal is modulated by a carrier signal and demodulated by a phase-shifted version of the carrier signal. The carrier signal is phase-shifted for the demodulator by an amount which compensates for the phase difference between the picture carriers of the direct and ghost signals. The demodulated signal is inverted and its amplitude adjusted to produce a pseudo-ghost signal which is substantially equal in amplitude but opposite in polarity to the ghost signal components. The pseudo-ghost signal is summed with the original video signal to cancel the ghost signal components, thereby producing a deghosted video signal.

Figure 1:
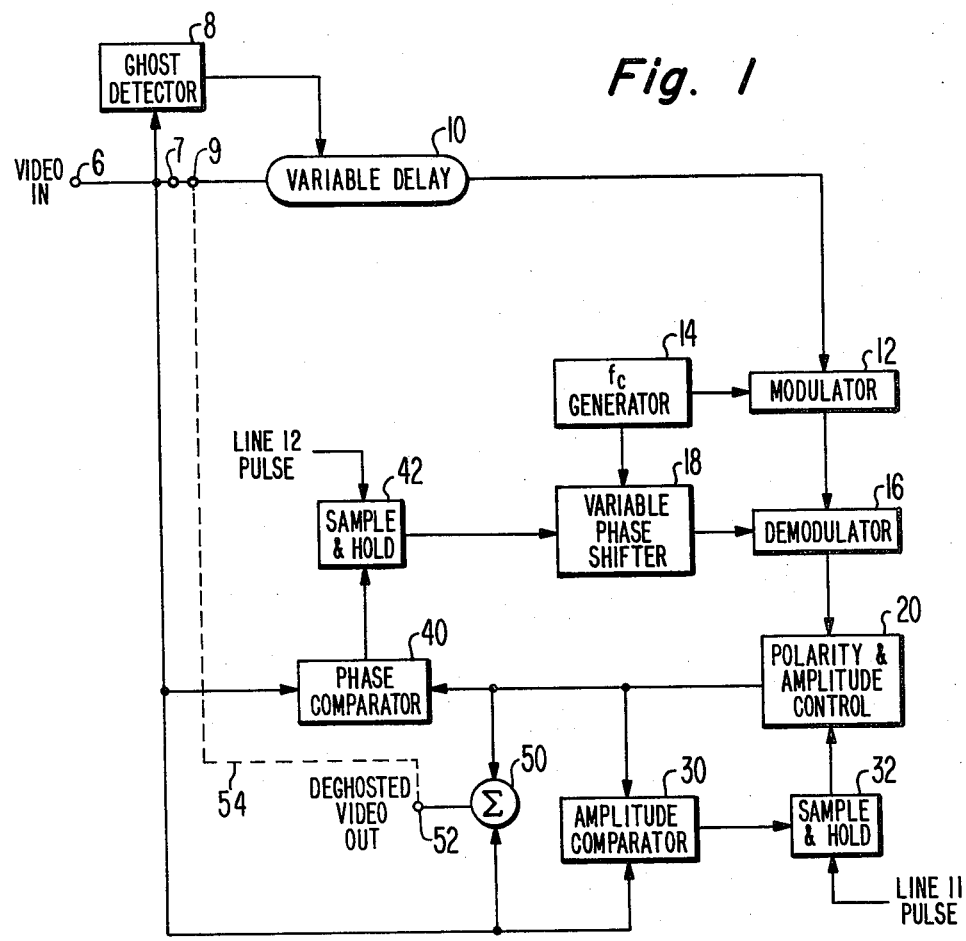
FIG. 1 illustrates, in block diagram form, a ghost cancellation system constructed in accordance with the principles of the present invention.

Referring to the ghost signal cancellation system of FIG. 1, a video signal which is subject to contamination by a ghost signal is applied to an input terminal 6. The applied video signal at terminal 6 is coupled to the inputs of a ghost detector 8, a variable delay line 10, a phase comparator 40, an amplitude comparator 30, and a summing network 50. An output of the ghost detector 8 is coupled to a control input of the variable delay line 10 to control the amount of delay provided by the delay line to the applied video signal. The output of the delay line 10 is coupled to an input of an amplitude modulator 12. A generator 14 develops a carrier, $f_c$, which is applied to a second input of the modulator 12, and to a signal input of a variable phase shifter 18. Outputs of the modulator 12 and the variable phase shifter 18 are coupled to inputs of a demodulator 16. The output of the demodulator 16 is coupled to the input of a polarity and amplitude control circuit 20.

The output of the polarity and amplitude control circuit is coupled to second inputs of the amplitude comparator 30, the phase comparator 40, and the summing network 50. The output of the amplitude comparator 30 is coupled to the input of a first sample and hold circuit 32, which has an output coupled to a control signal input of the polarity and amplitude control circuit 20. The first sample and hold circuit 32 also receives a sampling keying signal (line eleven pulse) at a control input. The output of the phase comparator 40 is coupled to an input of a second sample and hold circuit 42, which has an output coupled to a control input of the variable phase shifter 18. The second sample and hold circuit 42 receives a sampling keying signal (line twelve pulse) at a control input. A deghosted video signal is produced at an output terminal 52 coupled to the output of the summing network 50.

The variable delay line 10 may be constructed of a plurality of charge-coupled delay (CCD) elements driven by a variable clock signal from the ghost detector 8. The delay imparted to the applied signal is determined by the number of delay elements and the frequency of the clock signal. The ghost detector 8 may be of the types shown in my U.S. patent applications, Ser. Nos. 228,595 and 230,310, entitled "TELEVISION SIGNAL GHOST DETECTOR" and "TELEVISION GHOST DETECTOR SYSTEM", respectively, filed on Jan. 26, 1981. The application Ser. No. 228,595 describes a system which detects a television ghost signal and controls a voltage controlled oscillator to clock a CCD delay line so that the main television signal appears at the output of the delay line at the time that its corresponding ghost signal component is applied to the input of the delay line. Such a voltage controlled oscillator signal may be used to control the delay of the variable delay line 10 of the present invention. My patent application Ser. No. 230,310 shows an alternate technique for ghost detection which produces a voltage controlled oscillator control voltage without the use of a variable delay line.

The ghost detector systems of my above-mentioned patent applications and the ghost cancellation system of the present invention both use a component of the video signal of known characteristics as a training signal. The training signal is followed in time by a video signal interval which contains no picture information. If the video signal is contaminated by a ghost signal, a corresponding ghost of the training signal will appear during this interval and the ghost may therefore be readily detected and analyzed. Typical training signals and intervals used for ghost detection and cancellation include line 266 of the vertical synchronizing interval, the lines of the vertical retrace interval following the vertical synchronizing pulses, and specially transmitted pulses inserted into unused lines of the vertical retrace interval, such as sine-squared pulses. In the embodiments shown in my above-described patent applications, line ten of the vertical retrace interval, which contains a horizontal synchronizing pulse followed by no video information, is illustratively used as the training signal and interval for the ghost detectors there shown. In the ghost cancellation system of the present invention, a pulse coincident in time with the normally unused portion of line eleven, which line, like line ten, contains a horizontal synchronizing pulse and no picture information, is used to control sample and hold circuit 32, and a similar pulse, coincident with the normally unused portion of line twelve, is used to control sample and hold circuit 42. These control pulses may be derived in a similar manner as the line ten gating signal of my application Ser. No. 228,595.

The $f_c$ signal generator 14 produces a signal for the modulator 12 and variable phase shifter 18 of a frequency which is at least equal to the Nyquist sampling rate of the video signal being modulated. For the NTSC system with a video signal bandwidth of approximately 4.2 MHz, the $f_c$ signal frequency must be at least 8.4 MHz. Television receivers are now commercially available which include a CCD comb filter device clocked by a 10.7 MHz clock. This clock is a convenient source of the $f_c$ signal in these receivers, since such a signal is well in excess of the Nyquist sampling rate.

The variable phase shifter 18, the polarity and amplitude control circuit 20, the amplitude comparator 30, and the phase comparator 40 operate in a similar manner as the corresponding elements shown in my concurrently filed U.S. patent application Ser. No. 274,180, entitled "TELEVISION GHOST CANCELLATION SYSTEM WITH GHOST CARRIER PHASE COMPENSATION", which shows a different technique for compensating for the random carrier phase of the ghost signal.

Figure 2:
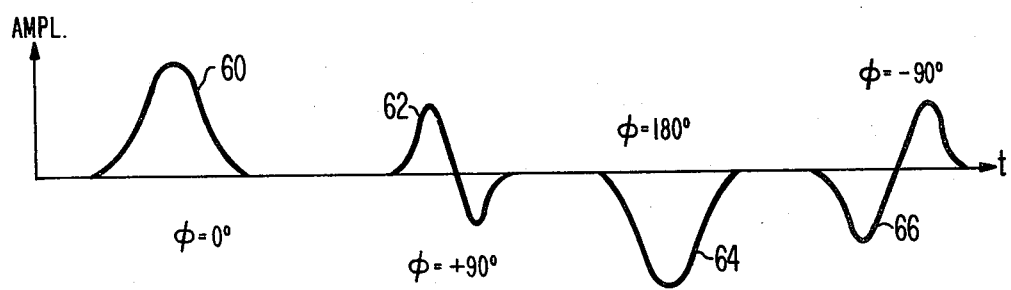
FIG. 2 shows baseband sine-squared 2T pulses resulting from the demodulation of different carrier phase angles.
Figure 3:
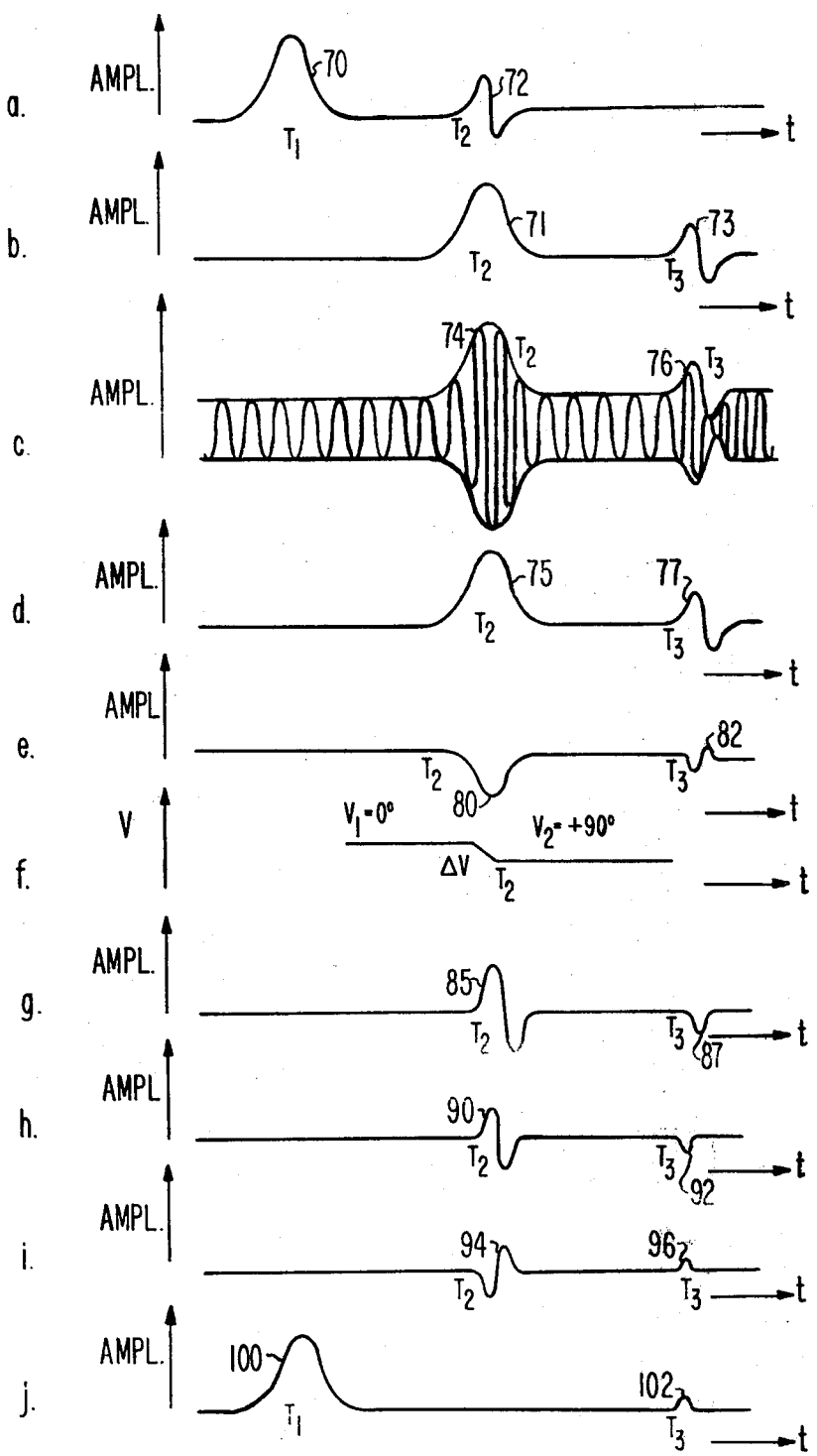
FIG. 3 illustrates waveforms useful for explaining the operation of the ghost cancellation system of FIG. 1.

The operation of the arrangement of FIG. 1 is explained by referring to the waveforms of FIGS. 2 and 3. For ease of illustration, it will be assumed that lines eleven and twelve of the video signal each contain a sine-squared 2T pulse to be used as the training signal, although it is to be understood that the horizontal synchronizing pulses of these lines may be used as training signals with similar results. The 2T pulse is used for this example because it exhibits the known property of negligible energy at frequencies above $f=1/h.a.d.$, where h.a.d. is the half amplitude duration, or pulse width, as measured at the 50% points. For a 2T pulse in the NTSC television system, T is defined as the Nyquist interval and is equal to 0.125 microseconds. For this 2T pulse, h.a.d.=0.25 microseconds, and the cutoff frequency is seen to be 4.0 MHz, above which frequency the pulse energy is negligible.

When the main video signal applied to terminal 6 of FIG. 1 contains a sine-squared 2T pulse which has been synchronously demodulated using a reference signal aligned in phase and frequency with the main video carrier signal, the demodulated video signal will contain the 2T pulse 60, as shown in FIG. 2. If the main video signal is contaminated by a ghost signal, and the phase of the ghost carrier signal is aligned in phase with the main video carrier signal, the ghost 2T pulse will also resemble pulse 60, although at a reduced amplitude. But if the ghost signal carrier is in a different phase relationship with the main signal carrier, such as +90°, 180° or −90° (=+270°), the demodulated ghost signal will take on a different appearance, as shown by waveforms 62, 64 and 66, respectively, of FIG. 2. The shape of the demodulated 2T signal ghost is a function of the phase relationship between the main signal picture carrier and the ghost signal picture carrier. Since this relationship is a random one dependent upon the relation of the lengths of the main and ghost signal paths, any intermediate waveform to those shown in FIG. 2 is also a possibility.

When the ghost detector 8 detects no ghost signals in the applied video signal, the variable delay line 10 is not activated. No signal will appear at the output of the variable delay line 10. The video signal applied to terminal 6 passes through the summing network 50 without alteration for subsequent signal processing.

When the ghost detector 8 detects the presence of a ghost signal, the variable delay line 10 is activated to produce a delayed video signal at its output. The variable delay line 10 provides a delay such that the applied video signals are delayed by the time interval between the appearance of the main signal and its corresponding ghost signal components. In this example, it is assumed that lines eleven and twelve of the video signal at terminal 6 each contains a 2T training pulse 70 at a time $T_1$, succeeded by its ghost signal 72 at time $T_2$, as shown in FIG. 3a. By comparing the ghost signal 72 with the waveforms of FIG. 2, it may be seen that the ghost signal 72 results from the demodulation of a ghost carrier signal exhibiting a +90° phase difference with respect to the picture carrier of the main signal 70. When the waveform of FIG. 3a is properly delayed by the delay line 10, the delayed main signal appears at the output of the delay line at time $T_2$, and is succeeded by a delayed ghost signal 73, as shown in FIG. 3b.

The delayed signal is modulated by the modulator 12 using the $f_c$ carrier from generator 14 to produce the waveform illustratively shown in FIG. 3c. The envelope of this modulated signal is seen to contain the delayed main signal 74 and its ghost signal 76. When the variable phase shifter 18 provides no phase shift to the applied $f_c$ carrier signal, the demodulator 16 demodulates the waveform of FIG. 3c using a reference signal of the same phase as the modulating $f_c$ carrier, producing the waveform of FIG. 3d. This waveform is seen to contain the delayed training signal 75 and its ghost signal component 77, substantially as shown in the signal of FIG. 3b that was modulated.

The waveform of FIG. 3d is applied to the polarity and amplitude control circuit, which inverts the signals and applies the inverted signals to the amplitude comparator 30. The amplitude comparator 30 compares the delayed and inverted training signal with the ghost signal 72 at its second input at time $T_2$. The resultant comparison signal is sampled and stored by sample and hold circit 32 in response to the line eleven keying pulse, producing a stored control signal for the polarity and amplitude control circuit 20. Since the loop consisting of the polarity and amplitude control circuit 20, the amplitude comparator 30, and the sample and hold circuit 32 operates to cause the delayed and inverted training signal to be substantially equal in amplitude but opposite in polarity to the ghost signal 72, the result of the comparison of this example will be to control the polarity and amplitude control circuit to attenuate the delayed signal.

During the next video line, line twelve, a waveform as shown in FIG. 3a will again be applied to terminal 6, assuming that the ghost signal characteristics have not changed. The variable delay line 10, the modulator 12, and the demodulator 16 will again produce a delayed waveform substantially as shown in FIG. 3d. The polarity and amplitude control circuit will invert and attenuate the applied delayed signal in response to the control signal stored by the sample and hold circuit 32, and will produce a waveform as shown in FIG. 3e. At time $T_2$, the phase comparator 40 is comparing the phase of the delayed, inverted and attenuated training pulse 80 of FIG. 3e with the ghost pulse 72 at its second input. The 90° phase difference between signals 72 and 80 will be detected and stored by the sample and hold circuit 42 in response to the line twelve keying signal. The control signal applied to the variable phase shifter 18 will change from the previous control level $V_1$, which caused no phase shift, to a new level $V_2$ which produces a 90° phase shift, as shown in FIG. 3f. The variable phase shifter 18 will now shift the applied $f_c$ carrier signal by 90° and apply this phase-shifted reference signal to the demodulator 16.

During the next video field, the ghost signal components of the applied video signal will be virtually completely cancelled. This may be seen by examining the effect of the ghost cancellation system on line eleven of this succeeding field. The applied video signal will again appear as shown in FIG. 3a if the characteristics of the ghost signal have not changed. The variable delay line 10 will produce the waveform of FIG. 3b, and the modulator 12 will produce the waveform of FIG. 3c. The demodulator 16 will demodulate the waveform of FIG. 3c using a reference signal which is substantially equal in frequency to the $f_c$ modulating signal, but shifted in phase by 90° relative to the modulating signal. As a result of this demodulation process, the demodulator output signal will appear as shown in FIG. 3g. The demodulated delayed training signal 85 and the demodulated delayed ghost signal 87 appear as shown in FIG. 3g due to the differently phased demodulating signal. The waveform of FIG. 3g is attenuated (as shown by the intermediate waveform of FIG. 3h) and inverted by the polarity and amplitude control circuit 20 to produce the pseudo-ghost signal of FIG. 3i. This pseudo-ghost signal is combined with the initial video signal of FIG. 3a by the summing network 50. The delayed pseudo-ghost signal component 94 at time $T_2$ at FIG. 3j is seen to be the complement of the ghost signal 72 at time $T_2$ of FIG. 3a. These two signals will mutually cancel, and the deghosted video output signal will appear as shown in FIG. 3j. The deghosted video signal is seen to contain the main training signal 100 at time $T_1$ and a small residual ghost signal 102 at time $T_3$. If desired, the residual ghost can also be eliminated by processing the output waveform through a similar ghost cancellation system, or, preferably, by coupling the system of FIG. 1 for recursive (feedback) operation. For recursive operation, the signal path between terminals 7 and 9 is broken. The output terminal 52 is coupled to the input terminal 9 of the variable delay line 10 as shown by broken line 54. The deghosted video signal at terminal 52 is recirculated through the ghost cancellation system, which continuously acts to cancel the residual ghosts left after cancellation of the primary ghost signal.

The stability of the $f_c$ carrier is not critical in the system of FIG. 1. Any drift of the $f_c$ signal in phase or frequency will apply equally to both the demodulator 12 and the demodulator 16. Any error introduced in the modulation process will therefore be eliminated in the demodulation process, with no net effect upon the accuracy of the ghost cancellation system.

What is claimed is:

1. In a television receiver, including a source of desired video signals, said signals being subject to contamination by ghost signals, and a television signal ghost detector responsive to said video signals for determining the time interval between the occurrence of said video signals and their corresponding ghost signal components when a ghost signal is present; a television signal ghost cancellation system for producing processed video signals comprising:

a variable delay line having an input coupled to receive one of said desired or processed video signals, and an output, and coupled to said ghost detector for delaying said video signals by a time substantially equal to the time interval between the occurrence of said desired video signals and their corresponding ghost signal components when a ghost signal is present;

a source of modulating carrier signals;

a modulator having a first input coupled to the output of said delay line for receiving said delayed video signals, and a second input coupled to said source of modulating carrier signals, and an output at which modulated delayed video signals are developed;

a variable phase shifter having a first input coupled to receive said modulating carrier signals, a control input, and an output;

a demodulator having a first input coupled to the output of said modulator, a second input coupled to the output of said variable phase shifter, and an output at which demodulated delayed video signals are developed;

means coupled to the output of said demodulator for developing pseudo-ghost signal components which are substantially equal in amplitude to, and aligned in time with said ghost signal components of said video signals from said source;

phase comparison means having a first input coupled to receive said pseudo-ghost signal components, a second input coupled to receive said video signals, and an output coupled to said control input of said variable phase shifter, for developing a control signal representative of the phase relationship between said ghost signal components and said pseudo-ghost signal components; and means having a first input coupled to receive said pseudo-ghost signal components, and a second input coupled to receive said video signals from said source, for combining said signals to produce said processed video signals, wherein said processed video signals are substantially free of ghost components.

2. In a television receiver, including a source of desired video signals, said signals being subject to contamination by ghost signals, and a television signal ghost detector responsive to said video signals for determining the time interval between the occurrence of said video signals and their corresponding ghost signal components when a ghost signal is present; a television signal ghost cancellation system comprising:

a variable delay line having an input coupled to receive said video signals, and an output, and coupled to said ghost detector for delaying said video signals applied to the input of said delay line by a time substantially equal to the time interval between the occurrence of said applied video signals and their corresponding ghost signal components when a ghost signal is present;

a source of modulating carrier signals;

a modulator having a first input coupled to the output of said delay line for receiving said delayed video signals, and a second input coupled to said source of modulating carrier signals, and an output at which modulated delayed video signals are developed;

a variable phase shifter having a first input coupled to receive said modulating carrier signals, a control input, and an output;

a demodulator having a first input coupled to the output of said modulator, a second input coupled to the output of said variable phase shifter, and an output at which demodulated delayed video signals are developed;

means coupled to the output of said demodulator for developing pseudo-ghost signal components which are opposite in polarity, substantially equal in amplitude to, and aligned in time with said ghost signal components of said video signals from said source;

phase comparison means having a first input coupled to receive said pseudo-ghost signal components, a second input coupled to receive said video signals from said source, and an output coupled to said control input of said variable phase shifter, for developing a control signal representative of the phase relationship between said ghost signal components and said pseudo-ghost signal components; and means having a first input coupled to receive said pseudo-ghost signal components and a second input coupled to receive said video signals from said source, for combining said signals to produce a deghosted video signal.

3. In a television receiver, including a source of desired video signals, said signals being subject to contamination by ghost signal components, and a television signal ghost detector responsive to said video signals for determining the time interval between the occurrence of said video signals and their corresponding ghost signal components when a ghost signal is present; a recursive television signal ghost cancellation system for producing processed video signals comprising:

a variable delay line having an input coupled to receive said processed video signals, and an output, and coupled to said ghost detector for delaying said processed video signals by a time substantially equal to the time interval between the occurrence of said desired video signals and their corresponding ghost signal components when a ghost signal is present;

a source of modulating carrier signals;

a modulator having a first input coupled to the output of said delay line for receiving said delayed video signals, and a second input coupled to said source of modulating carrier signals, and an output at which modulated delayed video signals are developed;

a variable phase shifter having a first input coupled to receive said modulating carrier signals, a control input, and an output;

a demodulator having a first input coupled to the output of said modulator, a second input coupled to the output of said variable phase shifter, and an output at which demodulated delayed video signals are developed;

means coupled to the output of said demodulator for developing pseudo-ghost signal components which are substantially equal in amplitude to, and aligned in time with said ghost signal components of said video signals from said source;

means having a first input coupled to receive said pseudo-ghost signal components, and a second input coupled to receive said video signals from said source, for combining said signals to produce at an output said processed video signals;

phase comparison means having a first input coupled to receive said pseudo-ghost signal components; a second input coupled to receive said video signals from said source, and an output coupled to said control input of said variable phase shifter, for developing a control signal representative of the phase relationship between the ghost signal components of said video signals and said pseudo-ghost signal components, wherein said processed video signals are processed to become substantially free of ghost signal components.

4. The arrangement of claims 1, 2 or 3, wherein said modulator comprises an amplitude modulator for producing amplitude modulated delayed video signals; and wherein said demodulator demodulates said amplitude modulated delayed video signals.

5. The arrangement of claim 1 or 2, wherein said source of desired video signals includes a signal component subject to use as a training signal; and wherein said phase comparison means comprises:

a phase comparator having a first input coupled to receive said pseudo-ghost signal components, a second input coupled to receive said video signals from said source, and an output at which a phase comparison signal is produced; and a sample and hold circuit having a signal input coupled to the output of said phase comparator, a signal output coupled to the control input of said variable phase shifter, and a control input responsive to a sampling control signal for sampling said phase comparison signal at a time following the occurrence of said training signal.

6. The arrangement of claim 5, wherein said pseudo-ghost signal component developing means comprises:

a polarity and amplitude control circuit having a signal input coupled to the output of said demodulator, an output at which said pseudo-ghost signal components are developed, and a control input responsive to a control signal for controlling the development of said pseudo-ghost signal components;

an amplitude comparator having a first input coupled to the output of said polarity and amplitude control circuit, a second input coupled to receive said video signals from said source, and an output at which an amplitude comparison signal is developed; and a second sample and hold circuit having a signal input coupled to the output of said amplitude comparator, a signal output coupled to said control input of said polarity and amplitude control circuit, and a control input responsive to a sampling signal for sampling said phase comparison signal at a time following the occurrence of said training signal.

7. The arrangement of claim 6, wherein said desired video signals include a second signal component subject for use as a second training signal, and wherein said control input of said second sample and hold circuit is responsive to a sampling signal for sampling said amplitude comparison signal during a time following the occurrence of said second training signal.

8. The arrangement of claim 7, wherein said combining means comprises a signal summing network.

9. The arrangement of claim 8, wherein said polarity and amplitude control circuit inverts said demodulated delayed video signals, and is responsive to said control signal produced by said second sample and hold circuit for attenuating said demodulated delayed video signals.

* * * * *